F. L. FULLER.
CASH REGISTER.
APPLICATION FILED DEC. 31, 1897.

1,003,732.

Patented Sept. 19, 1911.
8 SHEETS—SHEET 2.

Attest:
J. Kennedy
E. F. Kohol

Inventor:
Frederick L. Fuller
By Philipp Phelps Sanger
Attys

F. L. FULLER.
CASH REGISTER.
APPLICATION FILED DEC. 31, 1897.

1,003,732.

Patented Sept. 19, 1911.
8 SHEETS—SHEET 3.

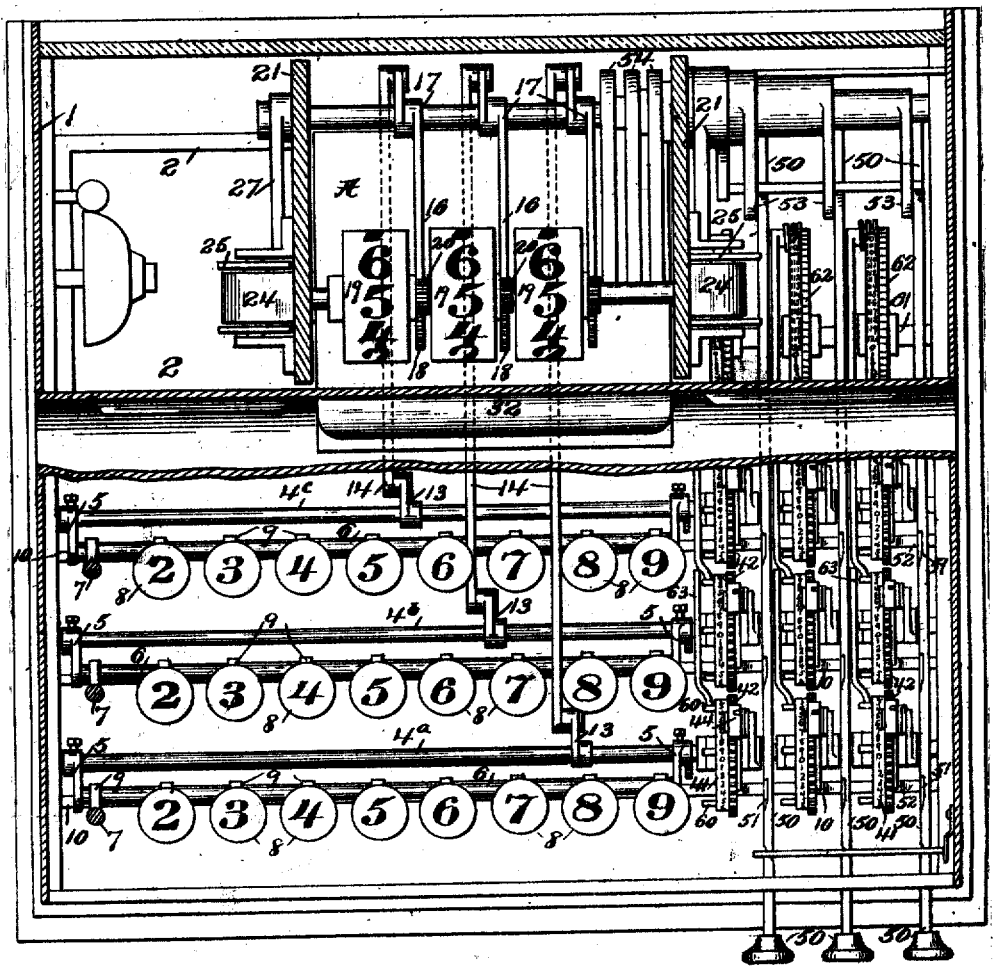

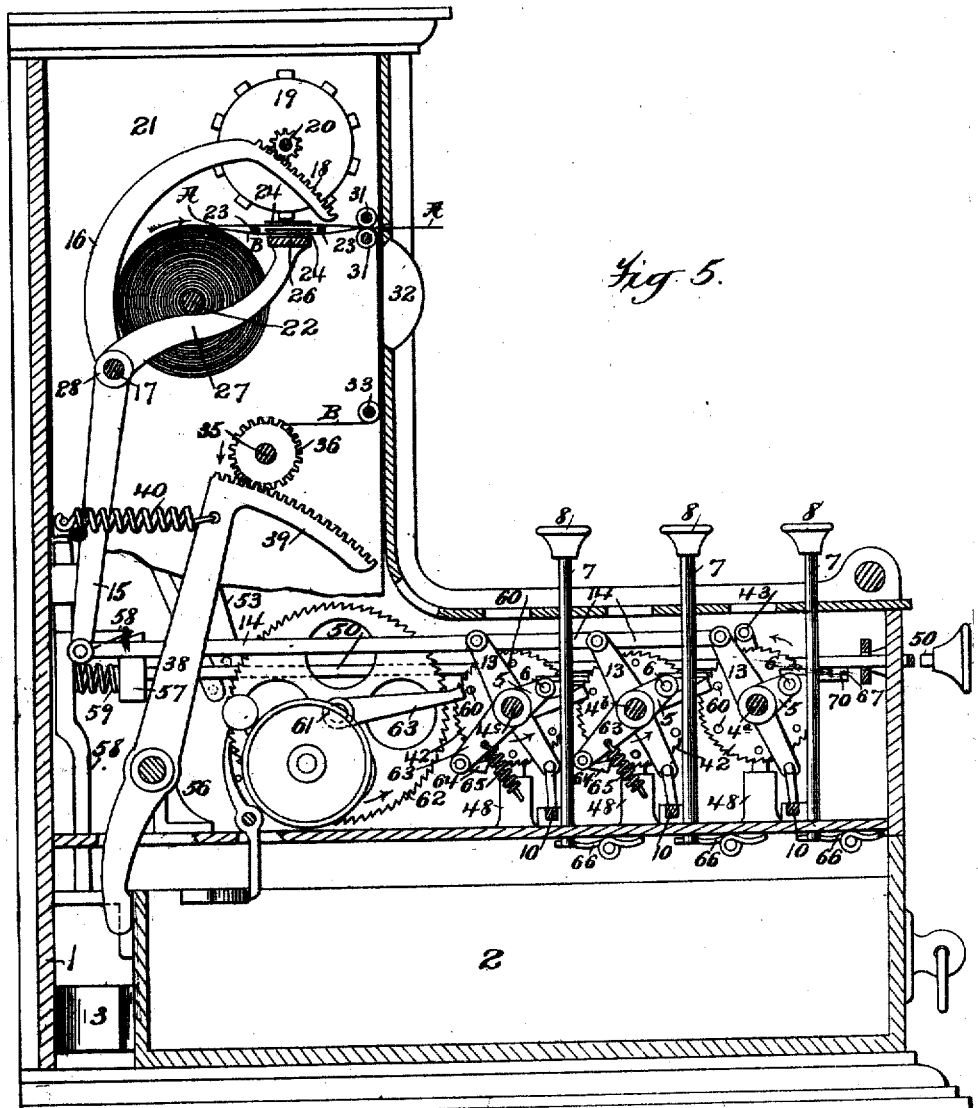

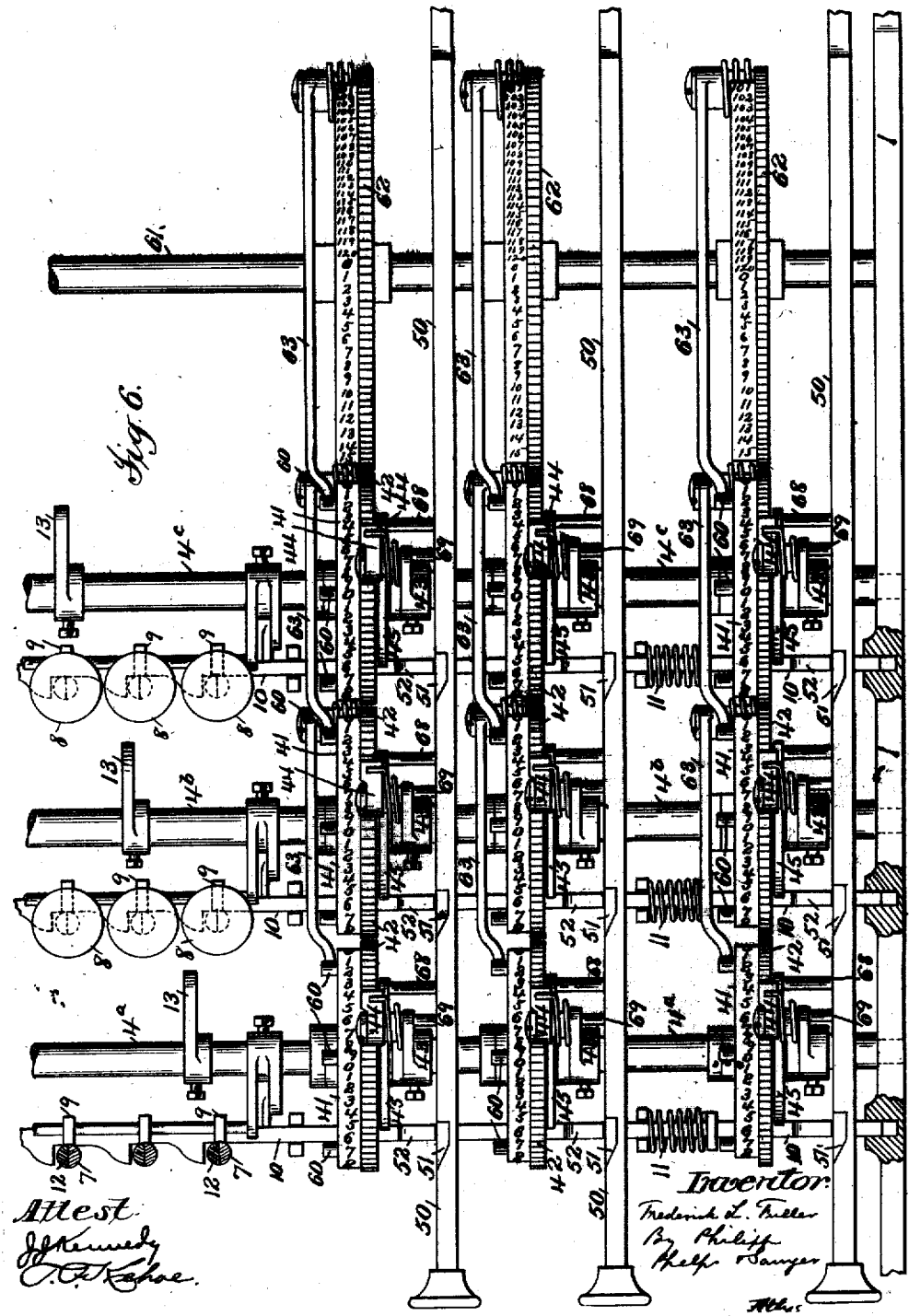

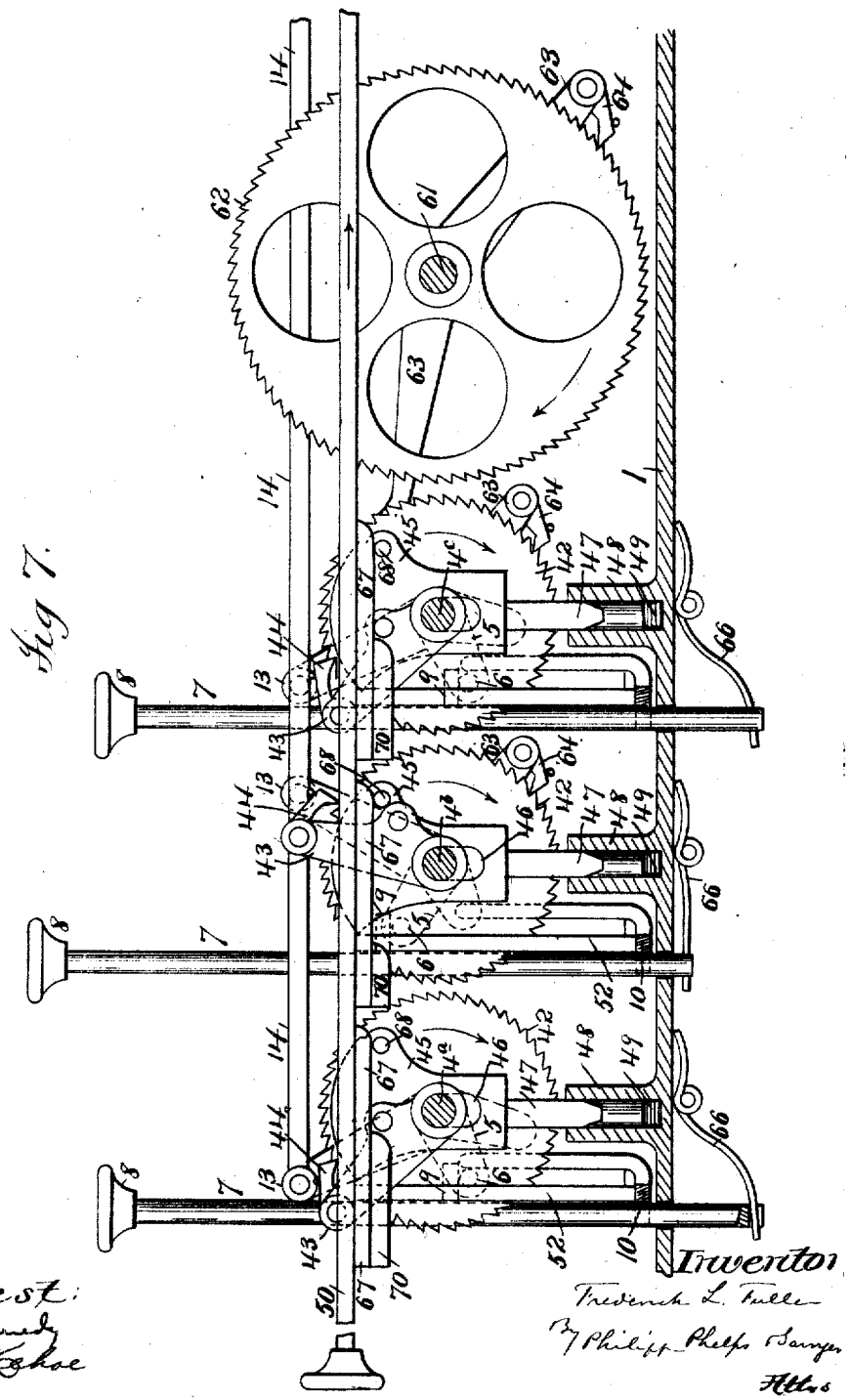

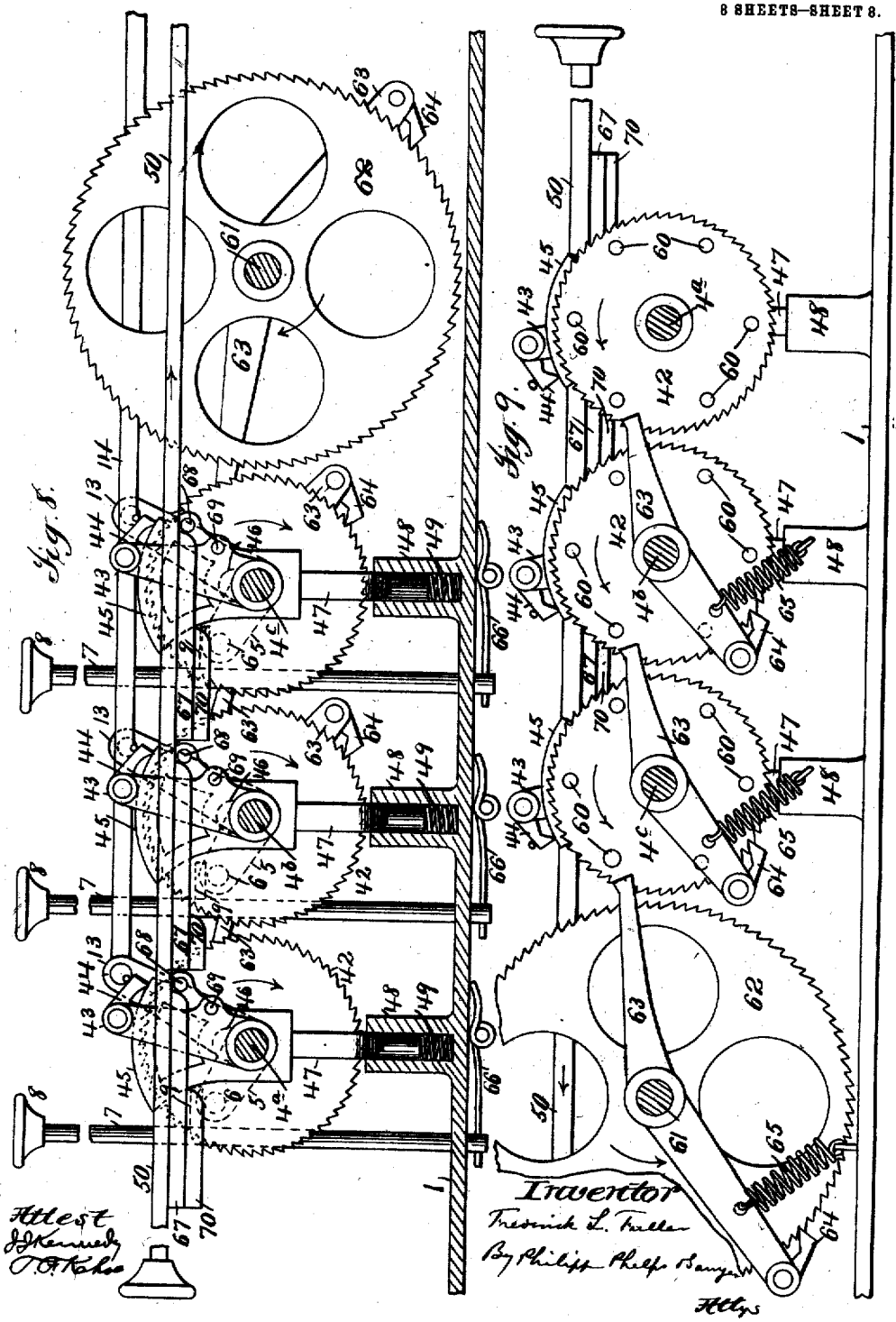

UNITED STATES PATENT OFFICE.

FREDERICK L. FULLER, OF TRENTON, NEW JERSEY, ASSIGNOR, BY MESNE ASSIGN-
MENTS, TO THE NATIONAL CASH REGISTER COMPANY, A CORPORATION OF OHIO.
(INCORPORATED IN 1906.)

CASH-REGISTER.

1,003,732.

Specification of Letters Patent.  Patented Sept. 19, 1911.

Application filed December 31, 1897. Serial No. 664,976.

*To all whom it may concern:*

Be it known that I, FREDERICK L. FULLER, a citizen of the United States, residing at Trenton, county of Mercer, and State of New Jersey, have invented certain new and useful Improvements in Cash-Registers, fully described and represented in the following specification and the accompanying drawings, forming a part of the same.

This invention relates to certain novel and useful improvements in machines for indicating sales and printing and adding checks, and has for its objects to provide a machine which shall temporarily indicate and permanently register the amount of each sale, which shall make for each such sale a check showing the amount of said sale, which shall also imprint upon said check in addition to the amount an additional word or sign which shall still further identify the check, as for instance the word "Bought", or the word "Sold", or the word "Charged". I also include in this machine in addition to the foregoing one or more totalizing registers which shall totalize respectively the amounts representing the aggregate of the checks bearing each of the distinguishing marks just referred to, that is to say, all sales charged shall be added together upon one of the totalizing devices, and likewise those which are bought or sold for cash will be separately added.

A further object is to make each printed check in duplicate whereof one copy is retained within the machine and the printing upon said copy forms the temporary indication, and the other is given to the customer and is taken by the cashier or retained as a memorandum.

With the ends just specified in view my invention consists in the construction and in the several combinations of elements which are hereinafter fully described and then recited in the claims.

Figure 1:
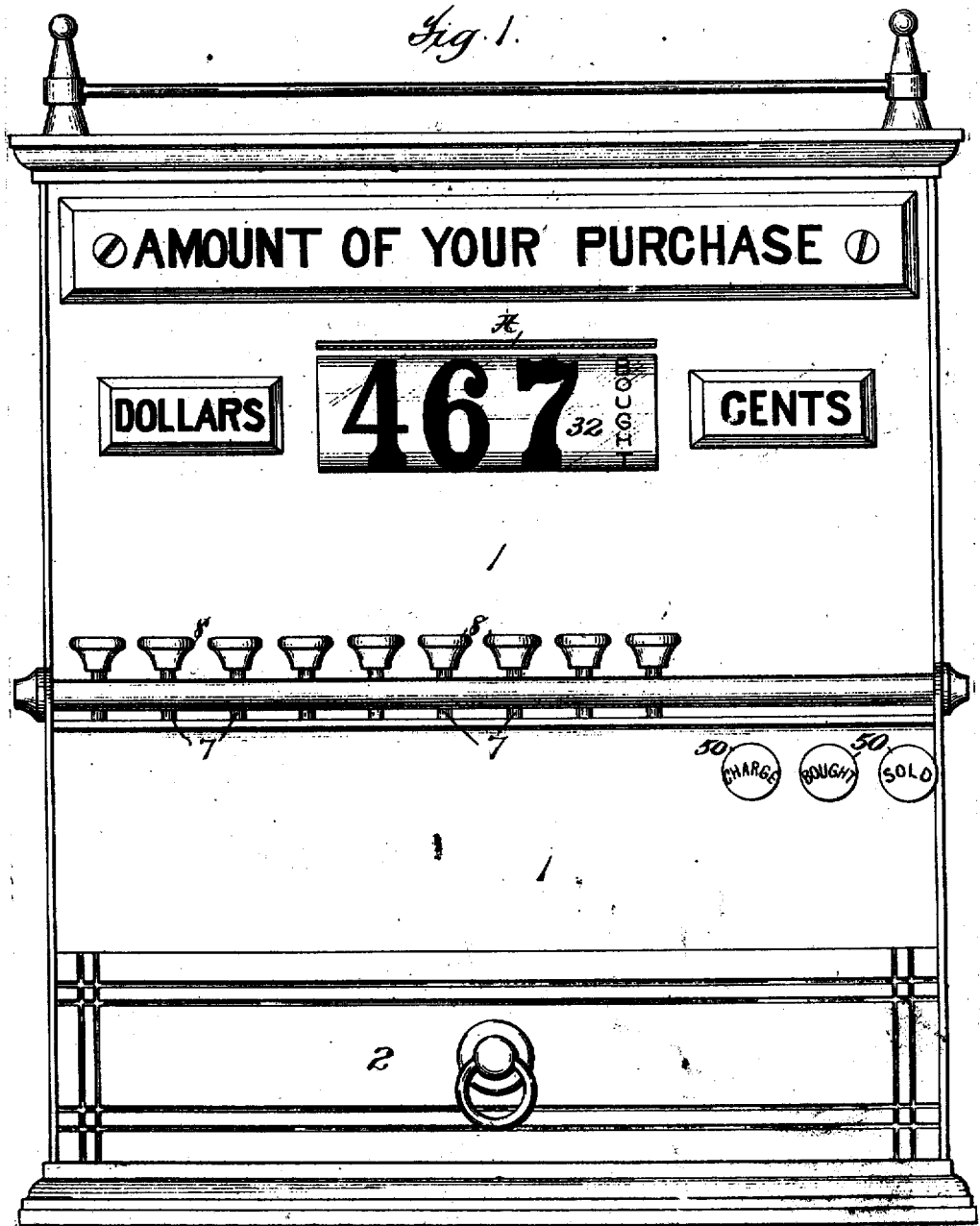
Figure 2:
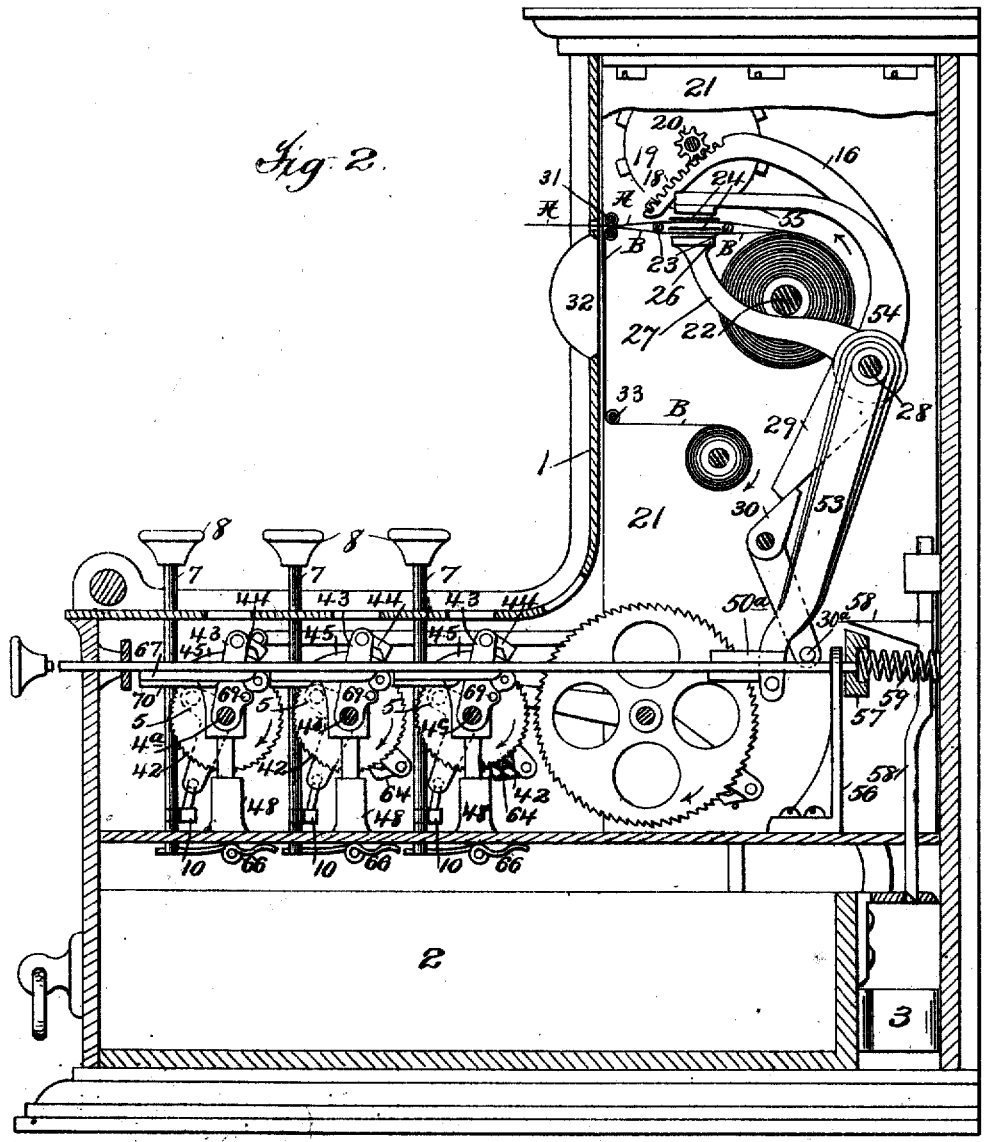
Figure 3:
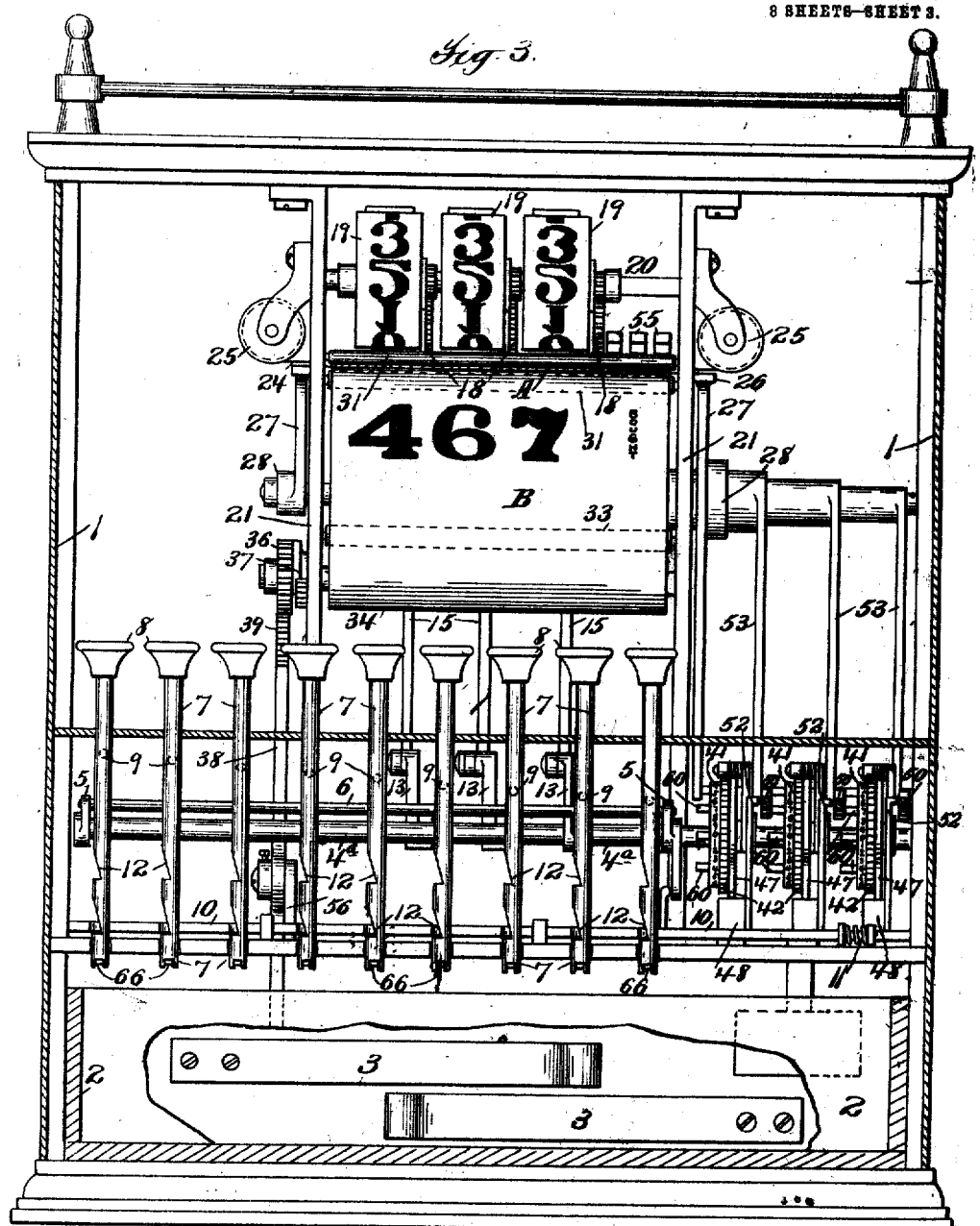

In order that those skilled in the art to which my invention appertains may fully understand its construction and method of operation I will describe the same in detail, reference being had to the accompanying drawings which form a part of this specification, and in which, Figure 1, is a front elevation. Fig. 2, an elevation from the right of Fig. 1, the case being in section. Fig. 3, front elevation with the case sectioned. Fig. 4, a plan view, with the case broken away. Fig. 5, an elevation from the left of Fig. 1, the case being sectioned. Fig. 6, an enlarged plan view of the mechanism shown at the right hand of Fig. 4. Fig. 7, a detail side elevation from the right of Fig. 6, two keys shown as depressed. Fig. 8, a similar view with all the parts in a state of rest. Fig. 9, a side elevation showing the same parts as Fig. 8 but looking in the other direction.

The same parts are referred to in each of the figures by the same numerals and letters of reference.

Referring now particularly to Figs. 1, 2, 3 and 4, 1 denotes an inclosing case of any suitable construction provided with a sliding drawer 2 in its bottom, said drawer having behind it and preferably attached to the case, springs 3 whereby it will be impelled outward when released from the lock, as will be hereinafter explained. In the outwardly projecting front portion of the case are three rock shafts 4ª, 4ᵇ and 4ᶜ hung in bearings at their ends and extended horizontally as shown transversely across the machine. (See Fig. 2.) These shafts are exactly alike, but from their position and connections they indicate respectively, the shaft 4ª and its connections, "cents"; the shaft 4ᵇ, "dimes"; and the shaft 4ᶜ "dollars"; or, in other words, units, tens and hundreds, respectively. Three of these shafts are sufficient in a machine in which it is not desired to register any single sale of a greater amount than $9.99, but of course it is readily apparent that the capacity of the machine in this respect may be indefinitely enlarged by increasing the number of these shafts. Each shaft has a rocking movement in its bearings up to, say 90 degrees of rotation. Secured to each of these shafts by means of arms 5 so as to be parallel therewith are rods 6 (see Fig. 3) by means of which when power is applied thereto said shafts may be turned. Arranged in bearings formed in the case, as is clearly apparent at Fig. 3, are three lines of vertically disposed keys 7, the stem of each being provided upon its upper extremity with a finger pad or button 8 adapted to be operated by the hand. Each row of these keys passes downward close to one of the rods 6 and each key is provided with a transverse pin 9 or its equivalent which projects outward over the rod so as to engage with and operate the latter when the key is depressed or moved downward. As appears by reference to Fig. 3 the pins 9 in the keys of each row are set in the stems of the keys at unequal distances from the tops of the latter. The reason for this is that it is desired to operate the shaft $4^a$, $4^b$ or $4^c$ as the case may be to an extent which varies with the value of the number of the key. For instance, suppose the total movement of said shaft be exactly 81 degrees. Then the pins 9 are arranged so that by pressing down the first key, i. e. that to the left, to its limit the pin will, by contact with the rod 6, rock the shaft nine degrees. As the pin on the second key is normally nearer to the rod 6 it will engage it sooner and move the shaft two spaces of nine degrees, or a total of 18 degrees, and so on up to key No. 9 which is adapted to impart 81 degrees of rotation to said shaft. The lower ends of all the key stems pass through openings in a strip or bar 10 which is spring actuated to the right in Fig. 3 in the direction of its length by a spring 11. Each of the key stems is provided with a pair of notches 12 into the uppermost one of which the spring-impelled bar will take when the key has been fully depressed, thereby retaining said key and the shaft in their depressed position until released as hereinafter set forth.

Referring now more particularly to Figs. 3, 4, and 5, each one of the shafts $4^a$, $4^b$ and $4^c$ is connected through a short arm 13, a horizontal rod 14 and a vertical rod 15 with a member 16 which is fulcrumed at 17 and carries a short curved rack 18. This rack meshes with a gear which is secured to a type wheel 19, said type wheel being journaled upon a shaft 20 supported between standards 21 and being provided with raised types upon its periphery, as seen in said figures. The arrangement just described is for the purpose of effecting such a rotation of the proper type wheel when a key is depressed, as will bring the figure represented by said key into printing position. Upon a short shaft 22 journaled between the standards 21 is wound upon a suitable spool two strips of paper one designated by A and the other B. Immediately beneath the type wheel these strips of paper are separated by small rollers 23 and between them is interposed an ink ribbon 24 for printing upon the lower strip of paper which ribbon is supported upon spools 25 and is fed from one to the other in any desired or usual manner. Above the upper strip another ink ribbon 24 is provided for printing upon the upper strip of paper, this latter ribbon being also wound upon the spools 25. These ribbons are shown in section at Fig. 5 and the spools appear at Figs. 3 and 4. Immediately below the periphery of the type wheel, as is shown at Fig. 2, is a platen 26 mounted upon an arm 27 which is journaled at 28 and has a lever arm 29 adapted to be engaged and turned by a pivoted lever 30 so as to drive the said platen upward against the surfaces of the three type wheels, whereby the types upon said wheels, which are then at the bottom thereof, will be caused to compress the two strips of paper heretofore referred to and the ink ribbons 24 together and thereby cause said ribbons to imprint upon the strips the amount of the sale. The means for effecting this printing will be presently described. By the use of two ribbons each inked upon one side only it will be readily understood that both checks may be printed so as to read in the usual manner. After being subjected to the printing process the two strips of paper pass outward between rollers 31. Thence the upper strip passes outward through a slit in the case, as seen at Fig. 5, and is adapted to be torn off by the salesman and handed to the purchaser to be given by him to the cashier. The other, or lower strip of paper, passes downward and inward across the front of a cylindric lens 32 mounted in an opening in the case. Thence it passes inward over roll 33 and is wound upon a roll 34. This roll is upon a shaft 35, and 36 is a gear journaled on the end of the shaft and connected with the roll by a pawl and ratchet 37, Fig. 3, so arranged that when the gear revolves in one direction the pawl will operate the ratchet and roller and thereby cause a feeding movement of the strip, and so that when the gear rotates in the other direction the ratchet will not be operated. The feeding movement just described is just sufficient to carry the strip along so that the number last printed thereon will be brought directly opposite the center of the cylindric lens which magnifies the printed characters so that they will be readily legible to the customer and salesman as well. The power for this feeding movement is derived from an arm 38 carrying a toothed sector 39 meshing with the gear 36. A spring 40 serves to operate the lever 38 in one direction, said lever being operated in the other direction by the engagement of its lower end with the back of the drawer. The operation of this combination of parts is as follows: When the drawer is opened after a sale and after the printing of the check, the spring 40 causes the sector 39 to operate the gear 36, during which movement of the gear the pawl passes backward over the ratchet and upon the return movement of the drawer the ratchet and roller are carried around by said pawl so as to draw down this strip to the required distance, and also to protrude the upper strip so that it may be torn off as a check. To facilitate this tearing one edge of the slit in the case is preferably a knife edge.

It remains to describe the construction of the totalizing devices, the manner in which these are attached to and operated by the several banks of keys, the manner in which the amount is added to the proper totalizer, and the means whereby the distinguishing mark, such as "Bought," "Sold" or "Charged" is imprinted on the check.

The parts now to be described are more particularly shown at Figs. 4, 6, 7, 8 and 9. Fig. 6 so far as it shows the mechanism, is identical with Fig. 4, which latter in its more crowded parts is not provided with all the letters of reference.

Each of the shafts $4^a$, $4^b$ and $4^c$ extends, as heretofore set forth, the entire width of the case, their end bearings being in the sides of said case. The mechanisms for making the additions are identical and as there are nine of them a description of one will suffice. Selecting, therefore, shaft $4^a$, 41 is an index wheel having a numbered periphery and provided with an attached ratchet wheel 42, said index and ratchet wheels being journaled upon the shaft $4^a$ not too loosely, but so as to be turned without great difficulty. Secured to and moving with the shaft $4^a$ is an arm 43 which projects upward a little above the periphery of the ratchet wheel and carries a spring actuated pawl 44 which will engage the toothed periphery of said ratchet wheel but which is somewhat wider than the face of said ratchet wheel as shown at Fig. 6. Set against or closely adjacent to the side of the ratchet wheel and between it and the pawl carrying-arm just described, is a shield 45 whose top surface is curved with substantially the same curve as the ratchet. This shield has a central elongated opening 46 through which the shaft $4^a$ passes, and said shield has also a downwardly extending stem 47 which has a sliding bearing in a hub 48 beneath the shaft $4^a$. A spring 49 is interposed beneath the stem 47. The effect of this arrangement is that the shield may have a vertical sliding movement relative to the ratchet wheel to effect the change in position of said shield which will be noted by comparison of Figs. 7, 8 and 9.

50 are three sliding push rods running from front to rear of the machine in a horizontal plane slightly above the shafts $4^a$, $4^b$, $4^c$ and at the sides of the arms 43 of said shafts. Each of said rods has notches 51 which are directly over the sliding locking strip 10 heretofore described, and which are adapted, as will presently appear, to operate upon vertical stems or posts 52 which project upward from said strip 10. The rear end of each of said rods is adapted to engage and operate a rock lever 53 whereof there are three, one for each push rod. Each of these bears an arm 54 carrying printing types 55 representing either the word "Bought" or "Sold" or "Charged", and according as either of these arms is depressed into the same horizontal plane as the types upon the wheels 19, its characters will be imprinted upon the checks by the same upward pressure of the platen which imprints the figures on said check. The end of each of the push rods heretofore referred to, after passing through a bracket 56 in which it is guided, bears a block 57 which upon the inward movement of said push rod will engage and raise an oblique-faced latch 58 whose lower extremity is beveled and takes into a notch in a bracket on the drawer. There are three of these blocks. The latch is common to all and adapted to be disengaged by either. A spring 59 is interposed behind each push rod and the inward movement of said rod is made against the energy of said spring, which latter effects the outward return movement of said rod.

Each of the index wheels on the shafts $4^a$, $4^b$ and $4^c$ has a transfer device whereby each series of ten numbers is transferred to the next higher series as one step upon the ratchet and index of the latter. The transfer from $4^c$ whose wheel represents dollars, is made to a large index and ratchet wheel 62 which has no transferring device and which represents tens of dollars.

The several transferring mechanisms, each of which is a duplicate of the other, are constituted as follows, reference being particularly had to Fig. 9. Upon the side away from the ratchet each index wheel carries a series of pins 60, each of which represents ten teeth upon the ratchet wheel attached to said index wheel. Upon each of the shafts $4^b$, $4^c$ and the shaft 61 which supports the large ratchet wheel 62, is journaled a lever 63, one end of which extends slightly into the plane of rotation of the pins on the next lower ratchet wheel. The other end of this lever carries a spring-actuated pawl 64 engaging the teeth of the ratchet wheel about whose shaft said lever is journaled. 65 is a spring whereby movement in one direction is imparted to said lever. 66 represents springs whereby the upward movement of the keys is effected.

Referring once more to the push rods 50 and the shields 45, each of said rods carries inclines 67 each of which is adapted to operate, when the rod is pushed in, to depress one of the shields through the medium of a pin 68 which projects outward from said shield and is engaged by said incline; and each arm 43 carries a pin 69 with which a shoulder 70 on the push rod engages for the performance of the addition, as will presently appear.

The operation of my invention is as follows:—Suppose it is desired to record and register a sale of eight cents. The key marked in the cents row 8 is first depressed to its full limit of movement where it is detained as against return by the locking strip engaging with the notch. Through the engagement of the pin 9 on the key with the rod 6 this movement will rotate the shaft 4ª eight spaces, or if the movement be as heretofore explained, a total of 72 degrees. This movement of the rock shaft will turn the type wheel, which represents cents, so that the type representing the figure 8 will be opposed to the printing platen, the movement of said wheel being accomplished by the mechanism previously described. At the same time the arm 43 which is on the shaft, 4ª and its pawls are carried backward along the curved top surfaces of the shields just above the peripheries of the ratchet wheel to a distance representing eight teeth upon said wheels. At this time, however, the pawls are held out of engagement with the ratchet wheels, so that if the parts were returned to their normal position said pawls would slip backward without in any wise adding anything upon either of the dial wheels. When this has been done the operator selects either of the push rods according as his use of the 8 key was connected with a sale for cash, or a charged sale, or a disbursement. Suppose the sale were for cash. He pushes upon the rod marked "Sold" and thereby the following effects are produced. First the inclines on the push rod operated engage and ride over the pins upon the shields, thereby depressing each of the shields which is connected with the registering trains marked "Sold." This permits the awl springs to force the pawls downward into engagement with the ratchet teeth. If, is the case supposed, the eight cent key has been depressed, the pawl will engage the ratchet wheel eight teeth back of the normal position of the pawl, while the dimes and dollars pawls not having been moved will engage at their normal positions. The inward movement of the push rod through the appropriate lever 53 depresses the type marked "Sold" into alinement with the type 8 on the cents printing wheel. Further inward movement of said push rod through the levers 30 and 29 raises the platen so as to cause the types to print the figures 008 and the word "Sold" upon the two strips of paper as heretofore explained. The means for so operating the lever 30 to raise the platen consists of a projection 50ª upon the rod 50 which, as said rod is pushed inward, engages a roller 30ª on the lower end of the lever 30. Further inward movement of said push rod lifts the latch 58 and permits the springs 3 to throw out the drawer, and simultaneously with the release of the drawer the incline notches 51 operating against the vertical extension 52 from the locking strip release the latter. By the shoulder 70 the arm 43 through its pin 69 is returned to its normal position and the dial wheel is thereby turned and the shaft 4ª is carried to its normal position. By the release of the strip 10 the depressed key, theretofore held down, is permitted to be returned by its spring. The pawls upon the "Charge" and "Bought" registering trains, as will be understood, slip back over the shields and therefore produce no addition to their trains. The pawl on the "Sold" train, however, has, as just described, engaged eight teeth of the ratchet and returned it thereby adding eight cents to the "Sold" register train. As the shaft returns to its normal position the depressed shields rise to the position shown at Fig. 2 ready for the next operation. As the drawer is shut after making the change the feeding of the paper takes place, whereby a check marked "$00.8 Sold" will be protruded through the case to be torn off, and likewise the continuous strip will be drawn downward so that the same amount and sign will be immediately behind the lens which so magnifies the printed letters that they may be read by the operator and purchaser.

In this my invention I do not wish to be confined to the exact details of construction which I have herein shown and described, since these may be widely varied without departing from the spirit of my invention.

What I claim is:—

1. In a cash register, the combination with two or more registers, of a series of special keys one for each register and each having connections to operate its appropriate register, and a series of keys, common to all of said registers, and constructed to predetermine the extent of such operation.

2. In a cash register, the combination with a series of registers, of a corresponding series of push rods representing different transactions and each having connections for actuating said registers, and a series of keys constructed when depressed to predetermine the extent of such actuation.

3. In a cash register, the combination with indicating means, of a plurality of registers, keys for predetermining an amount to be indicated and added on one of said registers, and a plurality of special keys one for each register and each having connections when operated to effect an indication of said predetermined amount, and a registration of said amount on the register appropriate to the operated key.

4. In a machine of the class described, the combination with a plurality of independently operable registering elements, of a bank of keys, operating devices for said elements with connections for positioning said operating devices from said keys, special keys, and means actuated thereby for returning said operating devices to normal position and thereby actuating said registering elements.

5. In a machine of the class described, the combination with a plurality of independently operable registering elements, of a bank of keys, operating devices for said elements with connections for positioning said operating devices from said keys, means for preventing connection of said operating devices with said registering elements, a plurality of special keys, and connections actuated thereby for withdrawing said preventing means and for also actuating said operating devices.

6. In a machine of the class described, the combination with a plurality of independently operable registering elements for one denomination, of a bank of keys, devices connected together and positioned by said keys for operating said registering elements, means normally preventing engagement of said operating devices and said registering elements, and special keys each for withdrawing one of said preventing means and for actuating the corresponding registering element.

7. In a machine of the class described, the combination with a plurality of independently operable registering elements for one denomination, of means common to all of the registering elements for differentially actuating them, a bank of keys controlling the differential movement of said common means, operating pawls for said registering elements driven by said common means, devices for holding or maintaining said pawls in inoperative condition, and a plurality of special keys with connections whereby each special key disables the holding means for a corresponding pawl.

8. In a machine of the class described, the combination with a plurality of independently operable registering elements for one denomination, of means common to all said elements for driving them, a bank of keys controlling the differential positioning movement of said common means, a plurality of pawls for said registering elements driven by said common means, devices normally holding or maintaining said pawls in inoperative condition, manually operable mechanisms for separately disabling said holding means, and devices for restoring said common driving means to normal position.

9. In a machine of the class described, the combination with a plurality of independently operable registering elements for one denomination, of means common to all said elements for driving them, a bank of keys for controlling a differential positioning of said common means, pawls mounted to be driven by said common means for actuating said registering elements, devices normally holding said pawls in inoperative condition, special keys for separately disabling means, and connections for positively restoring said common means and said pawls to normal position.

10. In a machine of the class described, the combination with a plurality of independently operable registering elements for one denomination, of driving pawls for said elements and a common means for actuating said pawls, a bank of keys controlling differential positioning of said common means, separate devices for each pawl normally holding the same in inoperative condition, special keys, one for each registering element for separately disabling said holding means, and devices for restoring said common means to normal position and thereby actuating the registering element corresponding to the special key employed.

11. In a machine of the class described, the combination with a series of groups of registering elements, each group being for one denomination, driving devices for said registering elements, comprising a plurality of actuating means each common to all registering elements in a group, banks of keys controlling the differential positioning of the common actuating means, pawls for each registering element with connections for driving them from said common means, devices normally holding all of said pawls in inoperative condition, and special keys one for each group of registering elements with connections whereby actuation of each special key disables the holding devices for the pawls of its group.

12. In a machine of the class described, the combination with a group of registering elements for one denomination, and pawls for driving said elements, of a common means carrying all said pawls, a bank of keys differentially adjusting said common means, shields holding the pawls normally out of operative relation with said registering elements and special keys for separately withdrawing said shields.

13. In a machine of the class described, the combination with a plurality of registering elements for one denomination, and a common means for actuating the same, of a driving device for each registering element and all driven by said common means, means normally holding said driving device in inoperative position, manipulative means for controlling differential positioning of said common means, and devices one for each registering element for disabling the holding means for the corresponding driving device with connections for then restoring said common means to normal position.

14. In a cash register, the combination with banks of keys, and shafts positioned adjacent said keys, of a plurality of registering wheels mounted on said shafts, operating pawls secured to said shafts, shields interposed between said pawls and said registering wheels, and an operating rod constructed to depress said shields and thereby permit said pawls to engage the registering wheels.

15. In a cash register, the combination with a key operated rock shaft, of a dial wheel and ratchet wheel journaled thereon, an operating pawl moving with the shaft and adapted to actuate the ratchet wheel, and a depressible guard or shield interposed between the ratchet and the pawl, and means for operating said guard or shield, substantially as described.

16. In a machine of the class described, the combination with type wheels and devices for differentially positioning them, of a platen positioned beneath said wheels and constructed to be raised against an ink ribbon and a record material passing said type wheels, and a plurality of special keys for separately operating said platen.

17. In a cash register, the combination with a series of banks of keys representing different amounts, of a series of type wheels, one controlled by each bank and adapted to be operated by any key of said bank, and a number of special keys for accomplishing the printing from the type wheels, substantially as described.

18. In a machine of the class described, the combination with printing mechanism and means for differentially positioning the same, of impression taking means, and a plurality of special keys each having connections for actuating said impression means.

19. In a machine of the class described, the combination with printing devices comprising type carriers, of manipulative devices with connections for differentially adjusting said type carriers, a platen for taking impressions from said carriers, and a plurality of special keys each having connections to positively force said platen against the type carriers.

20. In a cash register, the combination with printing wheels and means for setting the same, of a platen, a series of keys each having connections when operated to effect an operation of said platen, a series of type arms, one connected to each key, each having distinctive type, and constructed to be moved into coöperative relation with said wheels and platen upon an operation of its appropriate key.

21. In a machine of the class described, the combination with a printing mechanism including type carriers and means for differentially positioning them, of impression taking means, a series of type arms bearing distinctive type, and means for bringing any desired type arm to printing position and for operating said impression means.

22. In a machine of the class described, the combination with a printing mechanism including type carriers, and means for taking impressions therefrom, of a series of type arms bearing distinctive type, and separate means for each arm connected to bring the corresponding type arm to printing position, with connections whereby any of said separate means also actuates the impression means.

23. In a machine of the class described, the combination with printing mechanism including a type carrier, of a bank of keys, a bar connected to said type carrier, lost motion connections whereby said keys give differential motion to said bar, a plurality of special keys, means for taking impressions from said type carrier, and connections whereby any of said special keys may operate said impression means.

24. In a machine of the class described, the combination with printing mechanism, including a type carrier, of a bank of keys, connections having lost motion whereby said keys may differentially adjust said carrier, type arms having distinctive type thereon, impression means, and a plurality of special keys for separately bringing any desired type arm to printing position with connections whereby any of said special keys may operate said impression means.

25. In a cash register, the combination with a printing mechanism, of a plurality of registers, a series of special keys, one for each register, and constructed to operate the same, and connections from each special key for simultaneously operating the printing mechanism, to print the amount added to any register.

26. In a cash register, the combination with a plurality of keys arranged in separate banks or rows, a series of type wheels, one for each of the banks, a register connected to each of the banks, and an operating key for each register whereby the operations of addition and printing are effected.

27. In a cash register, the combination with a plurality of registers, of a series of keys constructed to predetermine the extents of operation of said registers, a series of special operating keys, one for each register, and connected to operate said register, and a printing mechanism, with connections from each special key to operate the printing mechanism whereby both printing and adding of amounts are effected.

28. In a cash register, the combination with a group of registering elements for one denomination, and a printing device, of an operating means for said registering elements and said printing device, manipulative means for differentially positioning said operating means, impression taking means, and special keys one for each registering element in the group, with connection whereby each special key actuates the coresponding registering element and actuates said impression means.

29. In a cash register, the combination with a group of registering elements of one denomination, and a printing device, of an operating means for all said elements and said printing device, manipulative means for differentially positioning said operating means, special keys, one for each registering element in the group, means controlled by each special key for connecting the corresponding registering element and the operating means, impression means, and connections whereby any of the special keys may actuate said impression means.

30. In a cash register, the combination with a plurality of registering devices each comprising denominational elements, of manipulative devices for determining the entry thereon, amount printing mechanism positioned under control of said manipulative devices, a plurality of special keys for determining in which register an amount shall be entered, special type carriers with connections controlled by said special keys for bringing them to printing position, and means for taking impressions from said amount printing mechanism by said special keys.

31. In a cash register, the combination with a plurality of registering devices each comprising denominational elements, and manipulative devices determining the entry thereon, of amount printing mechanism positioned under control of said manipulative devices, a plurality of special keys, with connections therefrom for determining in which register an amount shall be entered, special type carriers with connections operated from said special keys for bringing said carriers to printing position, a platen, and means to positively force it against both said amount printing mechanism and said special type carriers to print both an amount and a transaction characteristic on a record material.

32. In a cash register, the combination with a plurality of registers, each comprising denominational elements, and manipulative devices for determining the amount to be entered thereon, of printing mechanism comprising amount type carriers, with connections for positioning them under control of said manipulative devices, special keys determining which register an amount shall be entered in, special type carriers with connections operated by said special keys for bringing them to printing position and positioned to print in line with the amount type carriers, a platen, and means for forcing said platen against both amount and special type carriers, whereby each amount is printed with a transaction characteristic beside it.

33. In a cash register, the combination with a series of groups of registering elements, each group of one denomination, of operating devices, one for each group, and each common to the elements of its group, manipulative means for controlling the differential positioning of the operating devices, means for connecting said registering elements to said operating devices, means for normally holding said connecting means in inoperative condition, special keys, one for each element in a group, connections whereby said special keys disable said holding devices, amount printing devices controlled by said manipulative means, special printing devices operated by the special keys and positioned to print beside the amount printing devices and means for taking impressions from both the amount and the special printing devices.

34. In a cash register, the combination with registers comprising denominational elements, of banks of keys, operating devices for said registers positioned under control of said keys, devices comprising pawls for connecting said registers to said operating devices, means controlling the actuation of said connecting devices, a plurality of special keys, means whereby said special keys actuate said controlling means, amount type carriers with connections controlled by said banks of keys for adjusting them, special type carriers positioned by said special keys, and means for taking impressions from both said amount and said special type carriers.

35. In a cash register, the combination with registers comprising denominational elements, of manipulative devices, operating means for said registers positioned under control of said manipulative devices, means controlling the actuation of said registers by said operating means, a plurality of special keys and connections whereby said keys actuate said controlling means, amount type carriers controlled by said manipulative devices, special type carriers operated by said special keys, and a common means for taking impressions from both said amount and said special type carriers.

36. In a cash register, the combination with registers comprising denominational elements, of manipulative means, operating devices for said register controlled by said manipulative means, special keys, amount printing devices positioned under control of said manipulative means, a special type carrier positioned by said keys means for taking impressions from both the amount printing devices and the special type carrier, and means causing actuation of said registers by the operating devices when said special keys are actuated.

37. In a cash register, the combination with a plurality of registering devices, of a single series of manipulative devices, operating devices common to all of said registers and controlled by said manipulative devices, means for designating in which register amounts shall be entered, and devices for printing in a single column the amounts entered in any of the registers.

38. In a cash register, the combination with the keys and printing mechanism adapted to be set thereby, of two or more registers adapted to be set by said keys, and an operating rod connected to each of said registers and to the printing devices, whereby the amount indicated by the key may be printed and may be caused to be registered upon either of the registers, substantially as described.

39. In a cash register, the combination with the several banks of keys and the type wheels controlled thereby, of a plurality of registers adapted to be set by the keys, transferring mechanism arranged between the sets of register wheels, and operating rods engaging and adapted to actuate the registers, and means interposed between said rods and the printing mechanism for accomplishing the printing from the type wheels.

In testimony whereof I have hereunto set my hand, in the presence of two subscribing witnesses.

FREDERICK L. FULLER.

Witnesses:
J. J. KENNEDY,
T. F. KEHOE.